United States Patent
Sato

(10) Patent No.: US 7,449,247 B2
(45) Date of Patent: Nov. 11, 2008

(54) OLEFIN POLYMER COMPOSITIONS AND EASY-PEELABLE SEALANTS USING THE SAME

(75) Inventor: Masanobu Sato, Chiba (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 0 days.

(21) Appl. No.: 10/558,401

(22) PCT Filed: Apr. 8, 2004

(86) PCT No.: PCT/JP2004/005073

§ 371 (c)(1),
(2), (4) Date: Nov. 28, 2005

(87) PCT Pub. No.: WO2004/104088

PCT Pub. Date: Dec. 2, 2004

(65) Prior Publication Data

US 2007/0009753 A1 Jan. 11, 2007

(30) Foreign Application Priority Data

May 26, 2003 (JP) .............................. 2003-147662

(51) Int. Cl.
*B32B 27/32* (2006.01)
*C08L 23/10* (2006.01)
*C08L 23/08* (2006.01)

(52) U.S. Cl. ........................ 428/523; 428/515; 428/516; 428/520; 428/522; 525/240

(58) Field of Classification Search ................. 525/240; 428/515, 516, 520, 522, 523
See application file for complete search history.

(56) References Cited

U.S. PATENT DOCUMENTS

| 4,933,107 A | * | 6/1990 | Watanabe et al. ........... 252/511 |
| 5,128,414 A | * | 7/1992 | Hwo ........................... 525/240 |
| 5,277,988 A | * | 1/1994 | Sugi et al. .................... 428/516 |
| 5,635,261 A | * | 6/1997 | Georgelos et al. .......... 428/35.4 |
| 6,706,343 B1 | * | 3/2004 | Lind .......................... 428/34.9 |
| 2002/0013415 A1 | * | 1/2002 | Mechelaere et al. ......... 525/191 |
| 2006/0172143 A1 | * | 8/2006 | Breese et al. ............... 428/500 |
| 2006/0210801 A1 | * | 9/2006 | Sato et al. ................ 428/411.1 |

FOREIGN PATENT DOCUMENTS

| EP | 0 437 632 A1 | 7/1991 |
| JP | 63-29894 B2 | 6/1988 |
| JP | 64-3895 B2 | 2/1989 |
| JP | 10-147672 A | 6/1998 |
| JP | 2000-264367 | * 9/2000 |
| JP | 2002-146122 | * 5/2002 |
| WO | 95/20487 A1 | 8/1995 |

* cited by examiner

*Primary Examiner*—D. S Nakarani
(74) *Attorney, Agent, or Firm*—Buchanan Ingersoll & Rooney PC

(57) ABSTRACT

The present invention provides olefin polymer compositions that provide an easy-peelable sealant showing low temperature dependence of heat-sealing strength, excellent low-temperature sealability, sealing properties and appearance of the peeling section when used with polypropylene. In particular, the present invention includes as a composition having excellent heat and oil resistance a composition comprising in a particular proportion a propylene-based polymer (A), ethylene-based polymer (B) having a density of not less than 900 kg/m³, a non-crystalline or low-crystalline ethylene/α-olefin copolymer (C) and a tackifier resin (D), and as a composition having excellent oil resistance a composition comprising in a particular proportion an ethylene/unsaturated ester copolymer (E), a propylene-based polymer (A), a non-crystalline or low-crystalline ethylene/α-olefin copolymer (C) and a tackifier resin (D).

15 Claims, No Drawings

OLEFIN POLYMER COMPOSITIONS AND EASY-PEELABLE SEALANTS USING THE SAME

TECHNICAL FIELD

The present invention relates to olefin polymer compositions showing excellent sealing properties and easy-peelability when used with various materials and easy-peelable sealants using these compositions. In particular, the present invention relates to those olefin polymer compositions which are useful for use as easy-peelable sealants for polypropylene and easy-peelable sealants comprising such compositions.

BACKGROUND ART

Plastic containers equipped with an easy-peelable lidding material are used widely as containers for a wide variety of food and drinks such as pot noodle, jelly, yogurt and fermented bean curd and pharmaceuticals. Various materials have been proposed for the sealants which can be extrusion-laminated to be used for the sealing layer of such easy-peelable lidding materials, and have been commercialized up to the present. For example, compositions comprising an ethylene/vinyl acetate copolymer or an ethylene/ethyl acrylate copolymer and a tackier resin and compositions obtained by blending polyethylene or low-crystalline ethylene/α-olefin copolymer, for example, to such compositions are known to become sealants having both sealability and easy-peelability. (For example, Japanese Patent Publication No. SHO 63-29894 and Japanese Patent Publication No. HEI 1-3895.)

However, the number of the types of plastics materials used for the container bodies has increased, and there are some new plastics materials whose sealing requirements cannot be met by the conventional sealants. As a result, there is a demand for new sealants to become available. Besides, even with containers using the existing plastics materials, the heat-sealing requirements desired of them are different depending on applications and other new properties are required of them in some cases. There is also a demand for sealants meeting these requirements.

For example, polyethylene, polypropylene, polystyrene and polyester, etc., have long been used as container materials. However, on account of such problems as transparency, heat resistance, health, strength and cost, polypropylene has come into wider use. From the viewpoint of sealability and peelability, the lidding materials for such polypropylene containers have been required to have heat sealability at low temperatures, show low temperature dependence of heat-sealing strength, have proper heat-sealing strength to the container bodies, give a good feeling of peeling at the time of unsealing and have the peeling section having excellent appearance.

Furthermore, in the application areas of packaging pudding, jelly, fruits preserved in syrup, etc. if a container is packed with contents to the brim of the mouth of the container, the contents may spill out of the container at the time of peeling. For this reason, such container is sealed and packed by packing the contents so that there is some empty space between contents and lidding material. After packing and packaging, the container is subjected to boiling treatment in hot water for several tens of minutes at 85° C. to 95° C. for the purpose of sterilization. Consequently, in these application areas, it has been required that the sealing section should not be broken due to the expansion of the air in the empty space in the container at the time of boiling treatment and that there should be no change in sealing strength due to boiling treatment.

Moreover, in the oily food packaging application area, the sealants are required to have excellent oil resistance. Especially in those application areas in which retort treatment is given to the packages, there has been a demand for easy-peelable sealants that show adequate oil resistance at temperatures above 100° C.

Furthermore, there has been a demand for those small-capacity polypropylene containers which have a relatively low heat-sealing strength, show uniform strength in peeling and give a soft feeling at the time of peeling.

However, the fact is that no such sealant for use for polypropylene containers has been found that will meet the requirements as described above. For example, the easy-peelable sealants used in the prior art mentioned above posed a problem in the application areas requiring boiling and retort treatment as mentioned above or oil resistance in some cases because they generally had a low softening point and showed inadequate oil and heat resistance. Especially, with almost all of the conventional easy-peelable sealants, the amount of evaporation residues as determined in an n-heptane extraction test, a general hygienic test, was too large, and those materials were unfit to be used under temperature conditions exceeding 100° C. in the oily fool application area in some cases.

DISCLOSURE OF THE INVENTION

In these circumstances, the inventor of the present invention made a study to find an easy-peelable sealant which will meet one or more required properties mentioned above and therefore be suitable for use for polypropylene containers. As a result, the inventor came to find out that the olefin polymer compositions described below meet those desired required properties.

Accordingly, the object of the present invention is to provide polymer compositions suitable as easy-peelable sealants, particularly as a sealant for lidding material of polypropylene containers. More specifically, firstly, the object of the present invention is to provide olefin polymer compositions suitable for sealants which are superior in sealability, heat-sealability at low temperatures, easy-peelability, excellent appearance of peeling section, and which show low temperature dependence of heat-sealing strength and displays little change in sealing strength after 100° C. hot water treatment. According to a special embodiment of the invention, the present invention can provide an olefin polymer composition that is a sealant usable above 100° C. in the oily food application area while retaining the above properties. Secondly, the object of the present invention is to provide olefin polymer compositions which are superior in sealability, heat-sealability at low temperatures, easy-peelability, and which have the excellent appearance of peeling section, show low temperature dependence of heat-sealing strength and excellent oil resistance. Thirdly, the object of the present invention is to provide olefin polymer compositions which are superior in sealability, heat-sealability at low temperatures, easy-peelability, and which have the excellent appearance of peeling section, show low temperature dependence of heat-sealing strength, show uniform in peeling strength, and give a soft feeling at the time of peeling.

Another object of the present invention is to provide easy-peelable sealants using these olefin polymer compositions and packaging materials obtained by laminating such sealants onto substrates.

The first invention of the present patent application provides an olefin polymer composition obtained by blending 20 to 90 parts by weight of a propylene-based polymer (A), 80 to 10 parts by weight of an ethylene-based polymer (B) having a density of not less than 900 kg/m³, 1 to 70 parts by weight of a non-crystalline or low-crystalline ethylene/α-olefin copolymer (C) based on 100 parts by weight of a total amount of (A) plus (B), and 0.5 to 30 parts by weight of a tackifier resin (D) based on 100 parts by weight of a total amount of (A) plus (B), an easy-peelable sealant using such olefin polymer composition, and a packaging material obtained by laminating such easy-peelable sealant onto the substrate.

Use of the aforesaid olefin polymer composition as an easy-peelable sealant for polypropylene makes it possible to form a sealing layer that shows low temperature dependence of heat-sealing strength, makes sealing in a broad range of temperature possible, and shows excellent sealability, peelability, appearance of the peeling section, and hot-water and oil resistance. Furthermore, in such special embodiment of the invention, the olefin polymer composition can be used at temperatures above 100° C.

The second invention of the present patent application provides an olefin polymer composition obtained by blending 20 to 97 parts by weight of an ethylene/unsaturated ester copolymer (E), 1 to 30 parts by weight of the propylene-based polymer (A), 1 to 50 parts by weight of the non-crystalline or low-crystalline ethylene/α-olefin copolymer (C) and 1 to 30 parts by weight of the tackifier resin (D), an easy-peelable sealant using such olefin polymer composition, and a packaging material obtained by laminating such easy-peelable sealant onto the substrate.

Use of the aforesaid olefin polymer composition as an easy-peelable sealant for polypropylene makes it possible to form a sealing layer that shows low temperature dependence of heat-sealing strength, makes sealing in a broad range of temperature possible, and shows excellent sealability, peelability, appearance of the peeling section and oil resistance.

The third invention of the present patent application provides an olefin polymer composition obtained by blending 30 to 98 parts by weight of an ethylene/unsaturated ester copolymer (E-1) having an unsaturated ester content of 3 to 20 wt %, 1 to 40 parts by weight of an ethylene/unsaturated ester copolymer (E-2) having an unsaturated ester content of 25 to 50 wt %, 1 to 30 parts by weight of a wax (F) and 0 to 30 parts by weight of the tackifier resin (D), an easy-peelable sealant using such olefin polymer composition, and a packaging material obtained by laminating such easy-peelable sealant onto the substrate.

Use of the aforesaid olefin polymer composition as an easy-peelable sealant for polypropylene makes it possible to form a sealing layer that shows low temperature dependence of heat-sealing strength, makes sealing in a broad range of temperature possible, is relatively low in sealing strength and shows excellent sealability, peelability, appearance of the peeling section and uniform peeling strength.

PREFERRED EMBODIMENTS OF THE INVENTION

Propylene-Based Polymer (A):

The propylene-based polymer (A) used in the first and second inventions is a homopolymer of propylene or a copolymer of propylene as the main component and another α-olefin. Examples of the another α-olefin of the aforesaid propylene copolymer include α-olefins having approximately 2 to 20 carbon atoms such as ethylene, 1-butene, 1-pentene, 1-hexene, 1-octene, 1-decene and 4-methyl-1-pentene. Such another α-olefin may be copolymerized singly or in combination of two or more kinds of them.

In these propylene-based polymers, it is preferable to use the homopolymer of propylene or a random copolymer of propylene and an α-olefin having 2 to 4 carbon atoms, such as a random copolymer of propylene and ethylene or a random copolymer of propylene, ethylene and 1-butene which has an α-olefin content of not more than 20 mol %, particularly a random copolymer of propylene and ethylene which has an α-olefin content of not more than 10 mol %. Furthermore, in order to give adequate heat and oil resistance, among other properties, to such sealant, it is preferable to use a high-crystalline homopolymer or random copolymer having a melting point of not lower than 125° C., preferably 130° C. to 170° C., as determined by means of a differential scanning calorimeter. Moreover, in view of heat and oil resistance, extrudability and other properties, it is preferable to use a homopolymer or copolymer showing a melt flow rate (ASTM D1238) of 0.1 to 500 g/10 min., preferably approximately 0.5 to 100 g/10 min. as measured at 230° C. and a load of 2,160 g. Such propylene-based polymer can be obtained by polymerizing propylene or copolymerizing propylene and one or more other α-olefins in the presence of a stereospecific catalyst. The propylene-based polymer (A) may also be used in combination of two or more kinds of it.

Ethylene-Based Polymer (B):

The ethylene-based polymer (B) having a density of not lower than 900 kg/m³ that is used in the first invention is the homopolymer of ethylene or an ethylene/α-olefin copolymer comprising ethylene as the main component and one or two or more kinds of α-olefin having approximately 3 to 20 carbon atoms as the auxiliary components. The ethylene-based polymer (B) is a high-crystallinity polymer. Examples of the α-olefin in the aforesaid copolymer include α-olefins having approximately 3 to 20 carbon atoms such as propylene, 1-butene, 1-pentene, 1-hexene, 1-octene, 1-decene, 1-dodecene and 4-methyl-1-pentene. More specifically, examples of the ethylene-based polymer (B) include high-density polyethylene, medium-density polyethylene, high-pressure low-density polyethylene and linear low-density polyethylene (ethylene/α-olefin copolymer). Such ethylene-based polymer (B) can be manufactured by a medium- or low-pressure process or a high-pressure process by using a Ziegler-type catalyst, a Kaminski-type catalyst (metallocene-type catalyst) or a radical polymerization catalyst. For example, a linear low-density polyethylene produced by use of any catalyst system can be used. For example, a linear low-density polyethylene produced by copolymerizing ethylene and α-olefin in the presence of a single-site catalyst whose representative example is a Kaminski-type catalyst or a multi-site catalyst whose representative example is a Ziegler-type catalyst can be used.

It is preferable to use as ethylene-based polymer (B) an ethylene-based polymer having a density of not lower than 900 kg/m³, preferably 910 to 970 kg/m³, more preferably 915 to 960 kg/m³. It is also preferable to use an ethylene-based polymer showing a melt flow rate (JIS K7210-1999) of 0.1 to 500 g/10 min., preferably 1 to 150 g/10 min. as measured at 190° C. and a load of 2,160 g. The ethylene-based polymer (B) may be used in combination of two or more kinds of it. Further, in the present invention, the density of the ethylene-based polymer (B) was measured by the D method of JIS-K7112 (the density gradient tube method), using a material previously treated with boiling water for 30 min.

Non-Crystalline or Low-Crystalline Ethylene/α-Olefin Copolymer (C):

The non-crystalline or low-crystalline ethylene/α-olefin copolymer (C) used in the first and second inventions is a copolymer, preferably a random copolymer, of ethylene as the main component and an α-olefin having not less than 3 carbon atoms which shows a degree of crystallinity of normally 0% to 40%, preferably 3% to 30% as determined by X-ray diffraction. Furthermore, a copolymer having a density of not higher than 895 kg/m$^3$, preferably 860 to 890 kg/m$^3$, is preferable as the copolymer (C). Examples of the α-olefin having not less than 3 carbon atoms in the copolymer (C) include α-olefins having a carbon number of approximately 3 to 20 such as propylene, 1-butene, 1-pentene, 1-hexene, 1-octene, 1-decene, 1-dodecene, 1-hexadecene and 4-methyl-1-pentene, and particularly α-olefins having approximately 3 to 8 carbon atoms are preferable. In view of processability and oil resistance, it is preferable to use as the copolymer (C) a copolymer showing a melt flow rate (ASTM D1238) of 0.1 to 500 g/10 min., preferably approximately 1 to 150 g/10 min. as measured at 190° C. and a load of 2,160 g. These copolymers may be obtained by copolymerizing ethylene and α-olefin by use of a catalyst comprising a transition metal catalyst component, such as a vanadium compound and a metallocene compound of zirconium, and an organoaluminum compound catalyst component in such manner that the ethylene content of the copolymer becomes approximately 50 to 95 mol %, preferably 70 to 94 mol %, more preferably 82 to 93 mol %. These non-crystalline or low-crystalline ethylene/α-olefin copolymer may also be used in combination of two ore more kinds of them. Further, in the present invention, the density of the ethylene/α-olefin copolymer (C) was measured by the density gradient tube method without annealing in accordance with ASTM D1505.

Tackifier Resin (D):

Examples of the tackifier resin (D) used in the present invention include aliphatic hydrocarbon resin, alicyclic hydrocarbon resin, aromatic hydrocarbon resin, polyterpene-based resin, rosins, styrene-based resin and coumarone-indene resin. As examples of aliphatic hydrocarbon resin, resins that are obtained by polymerizing fractions containing at least one or more kinds of mono- or di-olefins having a carbon number of 4 to 5, such as 1-butene, isobutene, butadiene, 1,3-pentadiene and isoprene, can be cited. As examples of alicyclic hydrocarbon resin, resins obtained by polymerizing the diene component of spent $C_4$ to $C_5$ fractions after cyclization and dimerization, resin obtained by polymerizing cyclic monomer such as cyclopentadiene, and resin obtained by intranuclear hydrogenation of aromatic hydrocarbon resin can be cited.

As examples of aromatic hydrocarbon resin, resin obtained by polymerizing fractions containing at least one or more kinds of vinyl aromatic hydrocarbon of $C_8$ to $C_{10}$ such as vinyltoluene, indene and α-methylstyrene and resin obtained by copolymerizing these fractions and the aforesaid alicyclic hydrocarbon resin can be cited. As examples of polyterpene resin, α-pinene polymer, β-pinene polymer, dipentene polymer, terpene/phenol copolymer, α-pinene/phenol copolymer and hydrogenated materials of these can be cited.

Example of rosins include rosins such as gum resin, wood rosin and tall oil and modified materials of them, and examples of such modified materials include materials modified by hydrogenation, disproportionation, dimerization and esterification. Examples of styrene-based hydrocarbon resin include low molecular weight resin-like polymer obtained by polymerizing one or two or more kinds of styrene-based homopolymer such as styrene having high purity, vinyltoluene, α-methylstyrene and isopropyltoluene.

When the olefin polymer composition of the present invention is used for a package of food and drinks, the use of polyterpene resin or the resin obtained by internuclear hydrogenation of aromatic hydrocarbon resin is preferable in view of odorlessness, food hygiene and compatibility with other components. Ethylene/unsaturated ester copolymer (E):

The ethylene/unsaturated ester copolymer (E) used in the second invention are those copolymers which have an unsaturated ester content ranging 3 to 30 wt %, preferably 4 to 25 wt %. In the second invention, a copolymer having too low content of an unsaturated ester as the copolymer (E) is not preferable because of decease in the sealing strength with polypropylene which may cause a problem in sealability. Conversely a copolymer having too high content of a unsaturated ester as the copolymer (E) is not preferable either because the problem of stickiness or a deterioration in oil resistance may arise.

Examples of the unsaturated ester of the ethylene/unsaturated ester copolymer (E) include vinyl ester such as vinyl acetate and vinyl propionate, and unsaturated carboxylic acid ester such as methyl acrylate, ethyl acrylate, isopropyl acrylate, n-propyl acrylate, isobutyl acrylate, n-butyl acrylate, methyl methacrylate, ethyl methacrylate, isobutyl methacrylate, dimethyl maleate and diethyl maleate. Out of them, especially preferred is vinyl acetate and lower alkyl ester of acrylic acid or methacrylic acid. The ethylene/unsaturated ester copolymer (E) may be used in combination of two or more kinds of it.

It is also preferable to use as the ethylene/unsaturated ester copolymer (E) a copolymer showing a melt flow rate (JIS K7210-1999) of 0.1 to 500 g/10 min., preferably 1 to 150 g/10 min. as measured at 190° C. and a load of 2,160 g. Ethylene/unsaturated ester copolymers (E-1) and (E-2):

The ethylene/unsaturated ester copolymers (E-1) and (E-2) used in the third invention are the same as the aforesaid ethylene/unsaturated ester copolymer (E) except for the unsaturated ester content. A copolymer having an unsaturated ester content of 3 to 20 wt %, preferably 5 to 20 wt %, is used as the ethylene/unsaturated ester copolymer (E-1), and a copolymer having an unsaturated ester content of 25 to 50 wt %, preferably 25 to 35 wt %, is used as the ethylene/unsaturated ester copolymer (E-2). Thus, it is possible to obtain a composition that can be used as a sealant having proper sealing strength with polypropylene and uniform peeling strength by using both of the two ethylene/unsaturated ester copolymers in a proper ratio. In the third invention, if only the copolymer (E-1) is used, a composition having uniform peeling strength can be hardly obtained. If only the copolymer (E-2) is used, the composition may become sticky and may not have sufficient heat resistance, and a composition having proper sealing strength against polypropylene may not be obtained.

Examples of the unsaturated ester of the ethylene/unsaturated ester copolymers (E-1) and (E-2) include vinyl ester such as vinyl acetate and vinyl propionate, and unsaturated carboxylate ester such as methyl acrylate, ethyl acrylate, isopropyl acrylate, n-propyl acrylate, isobutyl acrylate, n-butyl acrylate, methyl methacrylate, ethyl methacrylate, isobutyl methacrylate, dimethyl maleate and diethyl maleate. Especially preferably are vinyl acetate and low-class alkyl ester such as acrylic acid or methacrylic acid. The copolymers (E-1) and (E-2) may be used in combination of two or more kinds of them, and the unsaturated ester of the copolymers (E-1) and (E-2) is the same or different.

It is preferable in view of processability, sealing strength and oil resistance, etc., to use as the ethylene/unsaturated ester copolymers (E-1) and (E-2) a copolymer showing a melt flow rate (JIS K7210-1999) of 0.1 to 500 g/10 min., preferably 1 to 150 g/10 min. as measured at 190° C. and a load of 2,160 g.

Wax (F):

The wax (F) used in the third invention may be either synthetic wax or natural wax. Examples of synthetic wax include polyolefin waxes such as polyethylene wax and polypropylene wax and synthetic waxes obtained by the Fischer-Tropsch method. The polyolefin waxes such as polyethylene wax and polypropylene wax may be a wax obtained by the low polymerization of olefin or a wax obtained by the thermal decomposition of high molecular weight polyethylene or polypropylene. It is also preferable to use as polyolefin wax a wax having a number average molecular weight of approximately 500 to 10,000, preferably 1,000 to 8,000 and a softening point of approximately 100° C. to 150° C., preferably 100° C. to 130° C. as measured by the ring and ball method. Polyolefin wax may also be a wax modified by such method as oxidation modification and graft modification using unsaturated carboxylic acid or its anhydride. Furthermore, examples of natural wax include paraffin wax separated from petroleum fractions, carnauba wax and microcrystalline wax. Out of these, the use of polyolefin wax is preferable.

Olefin Polymer Composition (1):

In the olefin polymer composition (1) of the first invention, it is important to blend the propylene-based polymer (A), the ethylene-based polymer (B) having a density of not less than 900 kg/cm$^3$, the non-crystalline or low-crystalline ethylene/α-olefin copolymer (C) and the tackifier resin (D) in a specified proportion. First, the use proportion of propylene-based polymer (A) and ethylene-based polymer (B) is the propylene-based polymer (A) being 20 to 90 parts by weight, preferably 30 to 80 parts by weight, more preferably 50 to 80 parts by weight, and the ethylene-based polymer (B) being 80 to 10 parts by weight, preferably 70 to 20 parts by weight, more preferably 50 to 20 parts by weight when the total of the two components is 100 parts by weight. Specifically, when the use proportion of the propylene-based polymer (A) is less than 20 parts by weight, the sealing strength of the composition with polypropylene may become lower, and the heat resistance may decline. Further, when the use proportion of the propylene-based polymer (A) exceeds 90 parts by weight, the composition may not show proper sealing strength in a broad range of sealing temperature.

Second, the use proportion of non-crystalline or low-crystalline ethylene/α-olefin copolymer (C) and tackifier resin (D), when the total parts by weight of the propylene-based polymer (A) and the ethylene-based polymer (B) is 100 parts by weight, is the non-crystalline or low-crystalline ethylene/α-olefin copolymer (C) being 1 to 70 parts by weight, preferably 10 to 60 parts by weight, and the tackifier resin (D) being 0.5 to 30 parts by weight, preferably 1 to 30 parts by weight based on 100 parts by weight of total amount of the propylene-based polymer (A) and the ethylene-based polymer (B) respectively. The blending of a proper amount of the non-crystalline or low-crystalline ethylene/α-olefin copolymer (C) will improve sealability and stringing properties, but the blending of an excess amount of the non-crystalline or low-crystalline ethylene/α-olefin copolymer (C) may impair the processability of the polyolefin composition in many cases. For this reason, the non-crystalline or low-crystalline ethylene/α-olefin copolymer (C) is blended in a proportion as mentioned above. Furthermore, sealability and stringing properties are improved by the addition of the tackifier resin (D). Especially when the blending ratio of the component (C) is 1 to 50 parts by weight based on 100 parts by weight of total amount of (A) and (B) and the blending ratio of the component (D) is 0.5 to 10 parts by weight, preferably 1 to 6 parts by weight, based on 100 parts by weight of total amount of (A) and (B), the n-heptane extraction amount of the composition will become not more than 30 ppm, and the composition is suitable for use as a sealant for oily food involving heat treatment at high temperature above 100° C. It should be noted that the n-heptane extraction amount of the composition is the amount of evaporation residues as determined in an n-heptane extraction test in which a film 30 μm thick made of the composition of the present invention is prepared and tested under the conditions specified in the Health and Welfare Ministry's Notification No. 370. When the blending amount of the tackifier resin (D) is 10 to 25 parts by weight, the composition will shows especially excellent easy-peelability. On the other hand, if the tackifier resin (D) is blended in an excess amount, the processability and oil resistance of the polyolefin composition may be impaired in many cases. For this reason, the blending ratio of the tackifier resin (D) is specified as described above.

Olefin Polymer Composition (2):

In the olefin polymer composition (2) of the second invention, it is important to blend the ethylene/unsaturated ester copolymer (E), the propylene-based polymer (A), the non-crystalline or low-crystalline ethylene/α-olefin copolymer (C) and the tackifier resin (D) in a specified proportion. Specifically, when the total parts of (E), (A), (C) and (D) is 100 parts by weight, 20 to 97 parts by weight, preferably 25 to 50 parts by weight, more preferably 20 to 40 parts by weight, of the ethylene/unsaturated ester copolymer (E), 1 to 30 parts by weight, preferably 5 to 25 parts by weight, more preferably 5 to 20 parts by weight, of the propylene-based polymer (A), 1 to 50 parts by weight, preferably 10 to 45 parts by weight, more preferably 20 to 45 parts by weight, of the non-crystalline or low-crystalline ethylene/α-olefin copolymer (C), and 1 to 30 parts by weight, preferably 5 to 25 parts by weight, more preferably 10 to 25 parts by weight, of the tackifier resin (D) are blended. The blending of a proper amount of the propylene-based polymer (A) improves oil resistance. However, if the blending amount is too large, the composition may not show proper sealing strength with polypropylene in a broad range of sealing temperature, and the processability may be impaired. The blending of a proper amount of the non-crystalline or low-crystalline ethylene/α-olefin copolymer (C) may improve sealability, but the blending of an excess amount of the non-crystalline or low-crystalline ethylene/α-olefin copolymer (C) will impair the processability of the olefin polymer composition (2) in many cases. For this reason, the non-crystalline or low-crystalline ethylene/α-olefin copolymer (C) is blended in a ratio as mentioned above. Furthermore, sealability is improved by the addition of the tackifier resin (D). However, if the blending amount of the tackifier resin (D) is too large, the processability and oil resistance of the olefin polymer composition (2) may be impaired in many cases. For this reason, the tackifier resin (D) is blended in a ratio as mentioned above. In order to control the sealing strength of the olefin polymer composition (2) of the second invention, it is possible to blend a small amount of other thermoplastic resin, such as the aforesaid ethylene-based polymer (B) having a density of not lower than 900 kg/m$^3$, poly-1-butene, styrene/butadiene/styrene block copolymer or its hydrogenated material, styrene/isoprene/styrene block copolymer or its hydrogenated material, for example, to the olefin polymer composition (2) in an amount of not more than 20 parts by weight, particularly not more than 10 parts by weight, based on 100 parts by weight of total amount of (E), (A), (C) and (D), for example.

Olefin Polymer Composition (3):

In the olefin polymer composition (3) of the third invention, it is important to blend the ethylene/unsaturated ester copolymers (E-1) and (E-2), the wax (F) and the tackifier resin (D) as required in a specified proportion. Specifically, when the total parts of (E-1), (E-2), (F) and (D) is 100 parts by weight, 30 to 98 parts by weight, preferably 40 to 90 parts by weight, more preferably 50 to 80 parts by weight, of the ethylene/unsaturated ester copolymers (E-1), 1 to 40 parts by weight, preferably 5 to 35 parts by weight, more preferably 10 to 30 parts by weight, of the ethylene/unsaturated ester copolymers (E-2), 1 to 30 parts by weight, preferably 2 to 20 parts by weight, more preferably 2 to 15 parts by weight, of the wax (F), and 0 to 30 parts by weight, preferably 1 to 20 parts by weight, more preferably 2 to 15 parts by weight, of the tackifier resin (D) are blended. Furthermore, it is preferable to use a total amount of the ethylene/unsaturated ester copolymers (E-1) and (E-2) in a proportion of 70 to 95 parts by weight, particularly 75 to 90 parts by weight, when the total parts of (E-1), (E-2), (F) and (D) is 100 parts by weight. The blending of the ethylene/unsaturated ester copolymers (E-1) and (E-2) in the aforesaid proportion makes it possible to obtain an olefin polymer composition (3) that provides a sealant which can be processed by extrusion lamination, has proper sealing strength with polypropylene and gives a soft feeling of peeling. Moreover, the blending of a proper amount of the wax (F) makes it possible to obtain a composition showing proper sealing strength in a broad range of sealing temperature. However, if the blending amount is too large, the processability of the composition may be impaired. Furthermore, the blending of a proper amount of the tackifier resin (D) may improve the sealability of the olefin polymer composition (3), but the blending of an excess amount of the tackifier resin (D) will impair the processability and oil resistance of the olefin polymer composition (3) in many cases.

In order to control the sealing strength of the aforesaid olefin polymer composition (3), it is possible to blend a small amount of other thermoplastic resin, such as the aforesaid ethylene-based polymer (B) having a density of not lower than 900 kg/m$^3$, poly-1-butene, styrene/butadiene/styrene block copolymer or its hydrogenated material, styrene/isoprene/styrene block copolymer or its hydrogenated material, for example, to the olefin polymer composition (2) in a proportion of not more than 20 parts by weight, particularly not more than 10 parts by weight, based on 100 parts by weight total amount of (E-1), (E-2), (F) and (D), for example.

With the olefin polymer compositions (1), (2) and (3) of the first through third inventions, various additives may be added to them as required. Lubricants and/or roll release agents which are used for the purpose of improving extrusion processability, roll release properties and film slip properties can be cited as representative examples of such additives. More specifically, examples of such additives include various amides such as palmitic acid amide, stearic acid amide, behenic acid amide, oleic acid amide, erucic acid amide, oleyl palmitamide, stearyl palmitamide, methylenebisstearyl amide, methylene bisoleyl amide, ethylene bisoleyl amide and ethylene bis(erucic acid amide), polyalkylene glycol such as polyethylene glycol and polypropylene glycol, and inorganic additives such as hydrogenated castor oil, silica and talc. A proper range of the blending amount of these additives is approximately 0.1 to 3 parts by weight for inorganic additives and 0.01 to 1 part by weight for other additives.

Antioxidants, heat stabilizers, light stabilizers, antistatic agents, pigments and dyes can be cited as examples of other additives that may be added as required.

Each of the olefin polymer compositions of the present invention can be produced by mixing the aforesaid essential components and any thermoplastic resin or additives that may be added as required simultaneously or sequentially. In producing the olefin polymer compositions (1), (2) and (3), it is preferable to use single-screw extruders, twin-screw extruders, Banbury mixer or various kneaders to melt and mix the components, and there is no limitation to the mixing sequence.

The olefin polymer compositions of the present invention thus obtained are preferably so produced that in view of extrudability and sealing strength and for the sake of causing the aforesaid other properties to be brought out, the melt flow rate (JIS K7210-1999) as measured at 190° C. and a load of 2,160 g is approximately 1 to 400 g/10 min., particularly 1 to 150 g/10 min.

The olefin polymer compositions (1), (2) and (3) of the present invention are suitable for use as easy-peelable sealants, particularly easy-peelable sealants for packaging materials, above all easy-peelable sealants for polypropylene. As mentioned above specifically, a olefin polymer composition (1) whose amount of evaporation residues as determined in an n-heptane extraction test in which is conducted under the conditions specified in the Health and Welfare Ministry's Notification No. 370 is not more than 30 ppm provides a sealant that is usable at a temperature above 100° C. for oily food applications. When the olefin polymer compositions are used for applications such as the ones mentioned above, they are usually used in the form of a laminate put on various substrates. Examples of the substrates used for such purpose include paper, aluminum, polyester, polyethylene, polypropylene, (high impact) polystyrene and aluminum-metallized polyester. These substrates do not have to be a single layer but may be a laminate comprising two or more layers.

In laminating the olefin polymer composition of the present invention, such methods can be used as a method in which the composition is processed into film in advance by the casting or blown-film extrusion process and laminated onto the substrate by the dry lamination method, a method in which the composition is extrusion-coated directly onto the substrate, a method in which the composition is laminated onto the substrate by sandwich lamination via an adhesive layer using polyethylene, etc., and a method in which the substrate and the composition are coextruded.

The laminates thus obtained can be used as various packaging materials. Especially, when they are used as lidding materials for various containers, particularly polypropylene containers, they provide lidding materials showing excellent sealability, easy-peelability and appearance of the peeling section, etc. Furthermore, these laminates can also be used as lidding materials for containers made of other material, for example polystyrene, polyester, polycarbonate and polyvinyl chloride, etc. These containers with such lidding can be used for packaging food and drinks such as jelly, pudding, yogurt, sour, fermented bean curd, lactic acid beverages, Japanese confectionery and processed meat, pharmaceuticals, medical containers, toners and other things.

EXAMPLES

The present invention is explained in more detail with examples below.

Raw materials used in examples and comparative examples are as follows.

[Raw Materials]

(1) Propylene Polymer (A)

PP-1: Propylene/ethylene/1-butene random copolymer (Ethylene content: 3.6 mol % (2.4 wt %), 1-butene content: 1.9 mol % (2.5 wt %), density: 910 kg/m$^3$, melt flow rate (MFR) (230° C.): 6 g/10 min)

PP-2: Propylene/ethylene random copolymer (density: 910 kg/m$^3$, MFR (230° C.): 25 g/10 min)

The densities of above propylene polymers were measured by density-gradient tube method without annealing in accordance with ASTM D 1505.

(2) Ethylene Polymer (B)

LD-1: High pressure low density polyethylene (density: 923 kg/m$^3$, MFR (190° C.): 3.7 g/10 min)

LD-2: High pressure low density polyethylene (density: 917 kg/m$^3$, MFR (190° C.): 7.0 g/10 min)

LL-1: Linear low density polyethylene (density: 920 kg/m$^3$, MFR (190° C.): 2.1 g/10 min)

LL-2: Linear low density polyethylene (density: 923 kg/m$^3$, MFR (190° C.): 3.7 g/10 min)

HD: High density polyethylene (density: 954 kg/m$^3$, MFR (190° C.): 1.1 g/10 min)

mPE: Linear low density polyethylene (metallocene catalyzed) (density: 925 kg/m$^3$, MFR (190° C.): 4.0 g/10 min)

(3) Non-Crystalline or Low-Crystalline Ethylene/α-Olefin Random Copolymer (C)

VL-1: Low crystalline ethylene/1-butene random copolymer (ethylene content: 89.1 mol %, crystallinity: 10%, density: 886 kg/m$^3$, MFR (190° C.): 4.0 g/10 min)

VL-2: Non-crystalline ethylene/propylene copolymer (density: 870 kg/m$^3$, MFR (190° C.): 2.1 g/10 min)

(4) Tackifier Resin (D)

P115: Hydrogenated aromatic hydrocarbon resin (Trade name: Arcon P115 (Product of Arakawa Chemical Industries Ltd.), ring and ball softening point: 115° C.)

P100: Hydrogenated aromatic hydrocarbon resin (Trade name: Arcon P100 (Product of Arakawa Chemical Industries Ltd.), ring and ball softening point: 100° C.)

(5) Ethylene-Unsaturated Ester Copolymer (A)

EVA-1: Ethylene-vinyl acetate copolymer (Vinyl acetate content: 6 wt %, melt flow rate (MFR) (190° C.): 8 g/10 min)

EVA-2: Ethylene-vinyl acetate copolymer (Vinyl acetate content: 14 wt %, MFR (190° C.): 15 g/10 min)

EVA-3: Ethylene-vinyl acetate copolymer (Vinyl acetate content: 19 wt %, MFR: 2.5 g/10 min)

EVA-4: Ethylene-vinyl acetate copolymer (Vinyl acetate content: 19 wt %, MFR: 15 g/10 min)

EVA-5: Ethylene-vinyl acetate copolymer (Vinyl acetate content: 28 wt %, MFR: 15 g/10 min)

(6) Wax (F)

Oxidation modified polyethylene wax (Number average molecular weight:3000, acid value:1.0 KOH mg/g)

Examples 1-5, Comparative Examples 1-3

A blown film of 50 μm thickness was prepared from a polyolefin composition having a blend ratio shown in Table 1. The film was laminated onto a polyethylene film side of two-layer laminated film composed of an orientated PET (12 μm thickness)/low density polyethylene (20 μm thickness), which made beforehand, by sandwich lamination method using a low density polyethylene (20 μm thickness) as an adhesive layer to obtain a test substrate.

The test substrate was lapped on a polypropylene sheet of 300 μm thickness so that the polyolefin composition layer contacted to the sheet and then heat-sealed under the conditions of 180° C., 0.2 MPa of pressure and 1.0 seconds of sealing time to obtain a laminate.

Peel strength was measured when the test substrate part was peeled off from the laminate. As the peel conditions, the degree of stringing was evaluated with the following standard by observing the heat-sealed part where the test substrate part was peeled off.

A: none or few stringing
B: small amount of stringing
C: many stringing

These results are jointly shown in table 1.

TABLE 1

|  |  | Example | | | | | Comparative Example | | |
|---|---|---|---|---|---|---|---|---|---|
|  |  | 1 | 2 | 3 | 4 | 5 | 1 | 2 | 3 |
| Material (weight part) | PP-1 | 30 | 45 | 60 | 40 | 45 | 85 | 60 | 60 |
|  | LD-1 | 30 |  |  |  |  |  |  |  |
|  | LL-1 |  | 15 |  |  |  |  |  | 40 |
|  | HD |  |  | 10 | 20 |  |  |  |  |
|  | mPE |  |  |  |  | 25 |  |  |  |
|  | VL-1 | 30 | 30 | 20 | 20 | 25 |  | 30 |  |
|  | VL-2 |  |  |  | 10 |  |  |  |  |
|  | P115 | 10 | 10 | 10 | 10 | 5 | 15 | 10 |  |
| Peel strength (N/15 mm) |  | 18 | 20 | 22 | 20 | 23 | 36 | 13 | 39 |
| Peel condition |  | A | B | B | A | B | C | C | C |

Examples 6-8, Comparative Example 4

A blown film of 30 μm thickness was prepared from a polyolefin composition having a blend ratio shown in Table 2. The film was laminated with an orientated PET (12 μm thickness) by sandwich lamination method using a low density polyethylene (20 μm thickness) as an adhesive layer to obtain a test substrate.

With this test substrate, n-heptane elution test was carried out in accordance with the test method D2(1) and D2(2)3 of third appliance and packaging container in Ministry of Health and Welfare notification No. 370 dated Dec. 28, 1959 by one side extracting the heat melted layer under over 100° C. of use temperature. And quantity of the evaporation residue from the resultant solution was measured. These results are jointly shown in Table 2.

In addition, same as in example 1, a laminate of the test substrate and polypropylene sheet of 300 μm thickness was prepared to measure the peel strength and observe the condition after peeling. These results are jointly shown in Table 2.

TABLE 2

|  |  | Example | | | Comparative |
|---|---|---|---|---|---|
|  |  | Example 6 | Example 7 | Example 8 | Example 4 |
| Material (weight part) | PP-1 | 40 | 45 | 40 | 60 |
|  | LL-2 | 25 |  |  | 40 |
|  | HD |  | 27 | 27 |  |
|  | VL-1 | 35 | 25 | 20 |  |
|  | VL-2 |  |  | 10 |  |
|  | P115 | 5 | 3 | 3 |  |
| Peel strength |  | 22 | 24 | 22 | 39 |

TABLE 2-continued

|  | Example | | | Comparative |
|---|---|---|---|---|
|  | Example 6 | Example 7 | Example 8 | Example 4 |
| (N/15 mm) Peel condition | B | A | A | C |
| N-heptane elution evaporation residue (ppm) | 29 | 19 | 23 | 10 |

Examples 9-12, Comparative Examples 5-6

A blown film of 50 μm thickness was prepared from an ethylene copolymer composition having a blend ratio shown in Table 1. The film was laminated onto a polyethylene film side of two-layer laminated film composed of an orientated PET (12 μm thickness)/low density polyethylene (20 μm thickness), which made beforehand, by sandwich lamination method by using a low density polyethylene (20 μm thickness) as an adhesive layer to obtain a test substrate.

The test substrate was lapped on a polypropylene sheet of 300 μm thickness so that the ethylene copolymer composition layer contacted the sheet and then heat-sealed under the conditions of 160° C., 0.2 MPa of pressure and 1.0 seconds of sealing time to obtain a laminate. The peel strength was measured by peeling the test substrate layer part from the resultant laminate. In addition, a test specimen of 2 cm by 4 cm by 3 mm was formed from the laminate and immersed in salad oil at 40° C. during 5 days, and then the oil resistance of it was evaluated as swell by visual observation. Evaluation was performed as follows.
A: not swelled at all
B: swelled in some extent
C: swelled much The evaluation results are jointly shown in Table 3.

TABLE 3

|  | Example | | | | Comp. Example | |
|---|---|---|---|---|---|---|
|  | 9 | 10 | 11 | 12 | 5 | 6 |
| Raw materials (parts by weight) | | | | | | |
| EVA-1 | 32 | 30 | 20 | 30 | 75 | |
| EVA-2 | | | 12 | | | |
| PP-2 | 15 | 15 | 15 | 12 | 15 | 15 |
| VL-1 | 35 | 20 | 20 | 20 | | |
| VL-2 | | 15 | 15 | 15 | | |
| P115 | 18 | 20 | 18 | 20 | 10 | 10 |
| LD | | | | 3 | | 75 |
| Peel strength (N/15 mm) | 22 | 22 | 20 | 22 | 15 | 13 |
| Oil resistance | A | A | A-B | A | A | A |

Examples 13-15, Comparative Examples 7-10

A 30 μm thickness of ethylene copolymer composition shown in Table 4 was extrusion coated onto a polyethylene film side of two-layer laminated film composed of an orientated PET (12 μm thickness)/low density polyethylene (20 μm thickness) which made beforehand to prepare a test substrate.

The test substrate was lapped on a polypropylene sheet of 300 μm thickness so that the ethylene copolymer composition layer contacted the sheet and then heat-sealed under the conditions of 160° C., 0.2 MPa of pressure and 1.0 seconds of sealing time to obtain a laminate. The peel strength was measured by peeling the test substrate layer part from the resultant laminate. In addition, the uniformity of the peel strength when the test substrate layer was peeled off from the same laminate was evaluated by observation. The evaluation was performed as follows.
A: peel strength was uniform
B: substrate layer was zip-peeled The evaluation results are jointly shown in Table 4.

TABLE 4

|  | Example | | | Comparative example | | | |
|---|---|---|---|---|---|---|---|
|  | 13 | 14 | 15 | 7 | 8 | 9 | 10 |
| Raw materials (parts by weight) | | | | | | | |
| EVA-2 | | | | | | 95 | 90 |
| EVA-3 | 70 | 65 | 44 | | | | |
| EVA-4 | | | 20 | | | | |
| EVA-5 | 14 | 25 | 23 | 90 | 77 | | |
| WAX | 10 | 3 | 6 | 10 | 20 | 5 | |
| P100 | 6 | 7 | 7 | | 3 | 10 | 10 |
| Peel strength (N/15 mm) | 10 | 10 | 10 | 5 | 5 | 15 | 15 |
| Uniformity of peel strength | A | A | A | A | A | B | B |

POSSIBILITY OF INDUSTRIAL USE

The present invention provides olefin polymer compositions suitable for use as easy-peelable sealants. The present invention provides olefin polymer compositions showing excellent sealability, low-temperature heat sealability, easy-peelability and appearance of the sealing section and low temperature dependence of heat-sealing strength, especially in the case of heat-sealing against polypropylene. Furthermore, since it is possible to control the heat-sealing strength of the olefin polymer compositions by changing the proportion of each component, the olefin polymer compositions can be used in various application areas. Especially since the olefin polymer composition (1) shows excellent oil and heat resistance as well as other properties and does not change significantly in sealing strength even after hot water treatment, it is suitable for use as sealants for retort food and oily food. In particular, an olefin polymer composition (1) in which the tackifier resin is blended in an appropriate amount can be used at temperatures above 100° C. in the oily food application areas. Furthermore, the olefin polymer composition (2) also exhibits excellent oil resistance and can be used as sealants for oily food.

The invention claimed is:

1. An olefin polymer composition obtained by blending 20 to 90 parts by weight of a homopolymer of propylene or a copolymer of propylene as the main component and another α-olefin (A), 80 to 10 parts by weight of an ethylene-based polymer (B) having a density of not less than 900 kg/m$^3$, 1 to 70 parts by weight of an ethylene/α-olefin copolymer having a crystallinity of 0 to 40% as determined by X-ray diffraction (C) based on 100 parts by weight of total of (A) plus (B), and 0.5 to 30 parts by weight of a tackifier resin (D) based on 100 parts by weight of total amount of (A) plus (B).

2. An olefin polymer composition according to claim 1 wherein the blending ratio of the ethylene/α-olefin copolymer (C) is 1 to 50 parts by weight and the blending ratio of the tackifier resin (D) is 0.5 to 10 parts by weight based on 100 parts by weight of total amount of (A) plus (B).

3. An olefin polymer composition according to claim 2 wherein the amount of evaporation residues as determined in an n-heptane extraction test in which is conducted under the conditions specified in the Health and Welfare Ministry's Notification No. 370 is not more than 30 ppm.

4. A sealant comprising an olefin polymer composition as claimed in claim 3.

5. A packaging material obtained by laminating a sealant as claimed in claim 4 onto the substrate.

6. A sealant comprising an olefin polymer composition as claimed in claim 2.

7. A packaging material obtained by laminating a sealant as claimed in claim 6 onto the substrate.

8. A sealant comprising an olefin polymer composition as claimed in claim 1.

9. A packaging material obtained by laminating a sealant as claimed in claim 8 onto the substrate.

10. An olefin polymer composition obtained by blending 20 to 97 parts by weight of an ethylene/unsaturated ester copolymer (E), 1 to 30 parts by weight of a propylene-based polymer (A), 1 to 50 parts by weight of an ethylene/α-olefin copolymer having a crystallinity of 0 to 40% as determined by X-ray diffraction (C) and 1 to 30 parts by weight of a tackifier resin (D).

11. A sealant comprising an olefin polymer composition as claimed in claim 10.

12. A packaging material obtained by laminating a sealant as claimed in claim 11 onto the substrate.

13. An olefin polymer composition obtained by blending 30 to 98 parts by weight of an ethylene/unsaturated ester copolymer (E-1) having an unsaturated ester content of 3 to 20 wt %, 1 to 40 parts by weight of an ethylene/unsaturated ester copolymer (E-2) having an unsaturated ester content of 25 to 50 wt %, 1 to 30 parts by weight of a wax (F) and 0 to 30 parts by weight of a tackifier resin (D).

14. A sealant comprising an olefin polymer composition as claimed in claim 13.

15. A packaging material obtained by laminating a sealant as claimed in claim 14 onto the substrate.

* * * * *